J. Carrier,
Bread Cutter.
Nº 24,099.     Patented May 24, 1859.
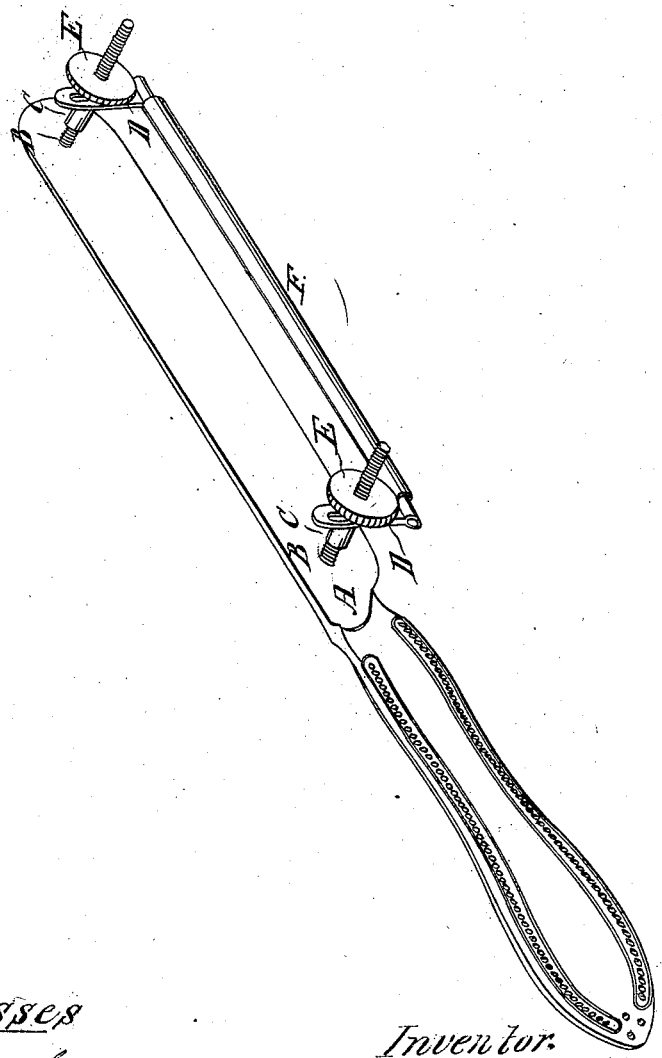
Witnesses
Benson H Finley
Jonny W Bys
Inventor:
Joseph Carrier

UNITED STATES PATENT OFFICE.

JOSEPH CARRIER, OF MARLBORO, CONNECTICUT.

BREAD-KNIFE.

Specification of Letters Patent No. 24,099, dated May 24, 1859.

*To all whom it may concern:*

Be it known that I, JOSEPH CARRIER, of Marlboro, county of Hartford, and State of Connecticut, have invented certain new and useful Improvements in Bread-Knives; and I do hereby declare that the same is described and represented in the following specification and drawings; and to enable others skilled in the art to make and use my improvement I will proceed to describe the construction, and referring to the drawings, in which the same letters indicate like parts in each of the figures.

The nature of this improvement consists in providing an adjustable roller gage to the outer side of the knife, in such a manner that the roller may be raised above, or depressed to or below the cutting edge of the knife, also it is so constructed that it (the said roller) may readily be moved either up to the blade of the knife, or out from it, such distance as is desirable to gage, or according to the thickness it is desired to cut the bread.

In the accompanying drawings is shown an isometrical view of my improved knife.

A, is the knife.

B, are the screws, secured in the blade of the knife, or they may be made so as to screw into nuts secured to the blade, and the thumb nuts secured to the end of the screw and provided with collars to hold the studs D, in place, but it is supposed the mode herein represented will be the best.

C, are collar nuts placed upon the screw between the studs D, and the blade of the knife.

D, are the slotted studs upon the screws B and having bearings for the ends of the roller F. By means of said slots the roller may be raised or lowered at pleasure.

F is the roller.

E, are the thumb nuts fitted to the screw B, for the purpose, with the collars C, of adjusting and holding the studs D and the roller F as desired.

Now it will be seen that by setting the collars C, and placing the roller in such position in relation to the edge of the knife as desired, it will be held in place by turning up closely the thumb nuts E. Thus it may be set to cut a slice any required thickness desired, and by the use of the roller, it will cut more easily, readily and without obstruction, thereby affording a very desirable article for family use.

I believe I have thus described my improvement so as to enable others to make them therefrom—and in doing so I have shown the advantage to be derived over others now or heretofore in use.

What I claim therefore and desire to secure by Letters Patent is—

The employment of the roller F, the adjustable studs D, with the collars C and thumb nuts E, substantially as and for the purpose described.

JOSEPH CARRIER.

Witnesses:
 DENISON H. FINLEY,
 JEREMY W. BLISS.